United States Patent
Kim (10) Patent No.: US 9,829,570 B2
(45) Date of Patent: Nov. 28, 2017

(54) SYSTEM AND METHOD OF DETECTING PRECEDING VEHICLE BY USING SENSOR

(71) Applicant: HYUNDAI MOBIS CO., LTD., Seoul (KR)

(72) Inventor: Won Gyum Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 421 days.

(21) Appl. No.: 14/613,859

(22) Filed: Feb. 4, 2015

(65) Prior Publication Data

US 2015/0253416 A1    Sep. 10, 2015

(30) Foreign Application Priority Data

Mar. 5, 2014    (KR) .................. 10-2014-0026106

(51) Int. Cl.
*G01C 3/00*    (2006.01)
*G01S 7/48*    (2006.01)
(Continued)

(52) U.S. Cl.
CPC .............. *G01S 7/4802* (2013.01); *B60T 7/12* (2013.01); *B60T 7/22* (2013.01); *G01S 7/4808* (2013.01);
(Continued)

(58) Field of Classification Search
CPC ...... G01S 17/89; G01S 17/936; G01S 7/4808; G01S 7/4802; B60T 7/12; B60T 7/22; B60T 2201/02
(Continued)

(56) References Cited

U.S. PATENT DOCUMENTS 7,571,081 B2 *    8/2009    Faulkner ............... G01S 7/4802
                                                                703/2
7,710,545 B2 *    5/2010    Cramblitt .............. G01S 7/4811
                                                                356/4.01
(Continued)

FOREIGN PATENT DOCUMENTS

CN            102834309 A      12/2012
DE    10 2004 003 870 A1      8/2005
(Continued)

OTHER PUBLICATIONS

Dutch Office Action dated Jan. 25, 2017 in counterpart Dutch Patent Application No. 102015203845.9 (7 pages in Dutch).
(Continued)

*Primary Examiner* — Mark Hellner
(74) *Attorney, Agent, or Firm* — NSIP Law (57) ABSTRACT

The present invention provides a system and a method of detecting a preceding vehicle. The system for detecting a preceding vehicle includes: an image sensor configured to generate image information containing information on reception intensity of light reflected from a preceding vehicle; a pixel detection unit configured to detect pixel areas corresponding to light reflected from rear reflectors of the preceding vehicle from the generated image information; and an Autonomous Emergency Braking (AEB) operation point controller configured to group adjacent pixel areas among the detected pixel areas, and classify the kind of vehicle of the preceding vehicle by using at least one element of information between information on the number of grouped pixel areas and information on an interval.

16 Claims, 9 Drawing Sheets

(51) Int. Cl.
    *B60T 7/12*     (2006.01)
    *G01S 17/93*    (2006.01)
    *G01S 17/89*    (2006.01)
    *B60T 7/22*     (2006.01)

(52) U.S. Cl.
    CPC ............ *G01S 17/89* (2013.01); *G01S 17/936* (2013.01); *B60T 2201/02* (2013.01)

(58) Field of Classification Search
    USPC ........................................................ 356/4.07
    See application file for complete search history.

(56) References Cited

U.S. PATENT DOCUMENTS

| | | | |
|---|---|---|---|
| 2005/0243301 A1 | 11/2005 | Takagi | |
| 2012/0050074 A1 | 3/2012 | Bechtel et al. | |
| 2012/0119894 A1* | 5/2012 | Pandy | B60W 30/16 340/435 |
| 2013/0110368 A1* | 5/2013 | Zagorski | B60T 7/22 701/70 |
| 2013/0250113 A1 | 9/2013 | Bechtel et al. | |
| 2015/0151669 A1* | 6/2015 | Meisner | B60Q 1/085 701/49 |

FOREIGN PATENT DOCUMENTS

| | | |
|---|---|---|
| DE | 10 2005 019 269 A1 | 11/2005 |
| DE | 10 2011 118 135 A1 | 5/2012 |
| DE | 10 2012 200 048 A1 | 7/2013 |
| WO | WO 2012/159109 A2 | 11/2012 |

OTHER PUBLICATIONS

Chinese Office Action dated Apr. 17, 2017 in Counterpart Chinese Application No. 201510097022.9 (7 pages in Chinese).

* cited by examiner

| I(1,1,10) | I(1,2,10) | I(1,3,10) | I(1,4,10) | I(1,5,10) | I(1,6,10) | I(1,7,10) | I(1,8,10) |
|---|---|---|---|---|---|---|---|
| I(2,1,10) | I(2,2,10) | I(2,3,10) | I(2,4,10) | I(2,5,10) | I(2,6,10) | I(2,7,10) | I(2,8,10) |
| I(3,1,10) | I(3,2,10) | I(3,3,10) | I(3,4,10) | I(3,5,10) | I(3,6,10) | I(3,7,10) | I(3,8,10) |
| I(4,1,10) | I(4,2,10) | I(4,3,10) | I(4,4,10) | I(4,5,10) | I(4,6,10) | I(4,7,10) | I(4,8,10) |
| I(5,1,10) | I(5,2,10) | I(5,3,10) | I(5,4,10) | I(5,5,10) | I(5,6,10) | I(5,7,10) | I(5,8,10) |

Cat's eye (40)

INTERVAL BETWEEN REAR REFLECTORS

SYSTEM AND METHOD OF DETECTING PRECEDING VEHICLE BY USING SENSOR

CROSS-REFERENCE TO RELATED APPLICATIONS

This application claims priority under 35 U.S.C. §119 to Korean Patent Application No. 10-2014-0026106, filed on Mar. 5, 2014, in the Korean Intellectual Property Office, the disclosure of which is incorporated herein by reference in its entirety.

TECHNICAL FIELD

The present invention relates to a system and a method of detecting a preceding vehicle, and particularly, to a system and a method of detecting a preceding vehicle, which detect a front preceding vehicle by using a 3-dimensional (3D) image camera sensor.

BACKGROUND

An autonomous emergency braking (AEB) system, which is a system for detecting a front preceding vehicle and controlling braking of a vehicle according to detected information, uses a 3D image camera sensor, such as a radio detection and ranging (RADAR) sensor, a light detection and ranging (LIDAR) sensor, a stereo camera, and a sensor fusion, in order to detect a preceding vehicle.

However, the RADAR sensor in a milliliter wave band has a disadvantage of low horizontal resolution, and the stereo camera in a visible ray area is vulnerable to a night environment. Accordingly, a recently developed AEB system exclusively uses the LIDAR sensor for detecting a preceding vehicle.

In the meantime, a preceding vehicle detecting system using a LIDAR sensor in the related art collects laser beam reflected and returned from a front preceding vehicle, calculates a distance to the preceding vehicle based on the collected laser beams, and detects and classifies the preceding vehicle by using the calculated distance information and the amount of collected light reflected.

However, there is a problem in that the preceding vehicle detecting system for classifying a preceding vehicle by using the amount of reflected light in the related art is very difficult to maintain reliability for classifying a preceding vehicle due to reflection noise by a color, a geometric shape, and a surrounding environment of the preceding vehicle, bad weather, and the like.

Accordingly, in addition to the preceding vehicle detecting system in the related art, a preceding vehicle detecting system for improving performance in classifying a preceding vehicle and minimizing erroneous detection of a preceding vehicle needs to be developed.

SUMMARY

The present invention has been made in an effort to provide a system and a method of detecting and classifying a preceding vehicle by using information on the number of rear reflectors mounted at a rear side of a vehicle and an interval between the rear reflectors, and determining an operation point of an autonomous emergency braking system of a host vehicle according to the detected and classified preceding vehicle.

An exemplary embodiment of the present invention provides a system for detecting a preceding vehicle, including: an image sensor configured to generate image information containing information on reception intensity of light reflected from a preceding vehicle; a pixel detection unit configured to detect pixel areas corresponding to light reflected from rear reflectors of the preceding vehicle from the generated image information; and an autonomous emergency braking (AEB) operation point controller configured to group adjacent pixel areas among the detected pixel areas, and classify the kind of vehicle of the preceding vehicle by using at least one element of information between information on the number of grouped pixel areas and information on an interval.

The AEB operation point controller may include: a classifier configured to classify the kind of vehicle of the preceding vehicle; and an operation point determination unit configured to determine an operation point of an AEB system of a host vehicle according to the classified kind of vehicle.

When the number of grouped pixel areas is one, the AEB operation point controller may classify the preceding vehicle into a two-wheel vehicle, and when the number of grouped pixel areas is two, and an interval between the grouped pixel areas belongs to a predetermined rear reflector reference interval range of a four-wheel vehicle, the AEB operation point controller may classify the preceding vehicle into a four-wheel vehicle.

When the number of grouped pixel areas is three, the AEB operation point controller may classify a group having the second largest interval among the intervals between the grouped pixel areas into the group of rear reflectors of the four-wheel vehicle.

The AEB operation point controller may classify the preceding vehicle into any one of a small-size vehicle, a midsize vehicle, and a full-size vehicle according to the information on the interval between the grouped pixel areas.

The AEB operation point controller may calculate a difference in a grade value between the preceding vehicle and a host vehicle with reference to a table, in which grades of the kind of vehicle are numerically expressed, and determine an operation point of the AEB system of the host vehicle according to a result of the calculation.

The pixel detection unit may detect light reflected from the rear reflector of the preceding vehicle by using a value of reflection intensity of light from a pre-learned cat's eye and a value of reflection intensity from the rear reflector.

The image sensor may be a light detection and ranging (LIDAR) sensor which is capable of generating reception intensity of light reflected from the preceding vehicle as 3-dimensional (3D) image information.

Another exemplary embodiment of the present invention provides a method of detecting a preceding vehicle, including: generating image information containing information on reception intensity of light reflected from a preceding vehicle; detecting pixel areas corresponding to light reflected from rear reflectors of the preceding vehicle from the generated image information; grouping adjacent pixel areas among the detected pixel areas; classifying the kind of vehicle of the preceding vehicle by using at least one element of information between the information on the number of grouped pixel areas and information on an interval; and determining an operation point of an autonomous emergency braking (AEB) system of a host vehicle according to the classified kind of vehicle.

The classifying of the kind of vehicle of the preceding vehicle may include classifying the preceding vehicle into a two-wheel vehicle when the number of grouped pixel areas is one.

The classifying of the kind of vehicle of the preceding vehicle may include classifying the preceding vehicle into a four-wheel vehicle when the number of grouped pixel areas is two, and an interval between the grouped pixel areas belongs to a predetermined rear reflector reference interval range of a four-wheel vehicle.

The classifying of the kind of vehicle of the preceding vehicle may include classifying a group having the second largest interval among the intervals between the grouped pixel areas into the group of rear reflectors of the four-wheel vehicle when the number of grouped pixel areas is three.

The classifying of the kind of vehicle of the preceding vehicle may include classifying the preceding vehicle into any one of a small-size vehicle, a midsize vehicle, and a full-size vehicle according to the information on the interval between the grouped pixel areas.

The determining of the operation point of the AEB system of the host vehicle may include calculating a difference in a grade value between the preceding vehicle and a host vehicle with reference to a table, in which grades of the kind of vehicle are numerically expressed, and determining an operation point of the AEB system of the host vehicle according to a result of the calculation.

The detecting of the pixel areas corresponding to the light reflected from the rear reflectors of the preceding vehicle may include detecting light reflected from the rear reflector of the preceding vehicle by using a value of reflection intensity of light from a pre-learned cat's eye and a value of reflection intensity from the rear reflector.

According to the exemplary embodiments of the present invention, it is possible to improve performance in classifying the preceding vehicle and minimizing erroneous detection compared to a system for detecting and classifying a preceding vehicle by using the amount of light reflection in the related art by detecting and classifying a preceding vehicle by using a geometric characteristic of a rear reflector mounted in a vehicle.

It is also possible to more accurately adjust an operation point of an AEB system by using information on the classified kind of vehicle of the preceding vehicle and travelling information about a host vehicle, thereby decreasing damages of a vehicle accident.

DETAILED DESCRIPTION OF EMBODIMENTS

The aforementioned objects, the other objects, advantages, and features of the present disclosure and methods accomplishing thereof will become apparent from the following detailed description of exemplary embodiments with reference to the accompanying drawings.

However, the present invention is not limited to the exemplary embodiment disclosed herein but will be implemented in various forms. The exemplary embodiments are provided so that a person with ordinary skill in the art to which the present invention pertains can fully understand the object, configuration, and effect of the present invention. Therefore, the scope of the present invention will be defined only by the appended claims.

Meanwhile, terms used in the present specification are to explain exemplary embodiments rather than limiting the present invention. Unless particularly stated otherwise in the present specification, a singular form also includes a plural form. The meaning of "comprises" and/or "comprising" used in the present specification does not exclude the existence or addition of one or more constituent elements, steps, operations, and/or device to mentioned constituent elements, steps, operations, and/or devices.

The present invention provides a preceding vehicle detecting system, which detects and classifies a preceding vehicle by using the number of rear reflectors of the preceding vehicle and an interval characteristic, and determines an operation point of an autonomous emergency braking (AEB) system by using the kind of the classified preceding vehicle and information about a host vehicle.

Hereinafter, an exemplary embodiment of the present invention will be described in detail with reference to the accompanying drawings.

Figure 1:
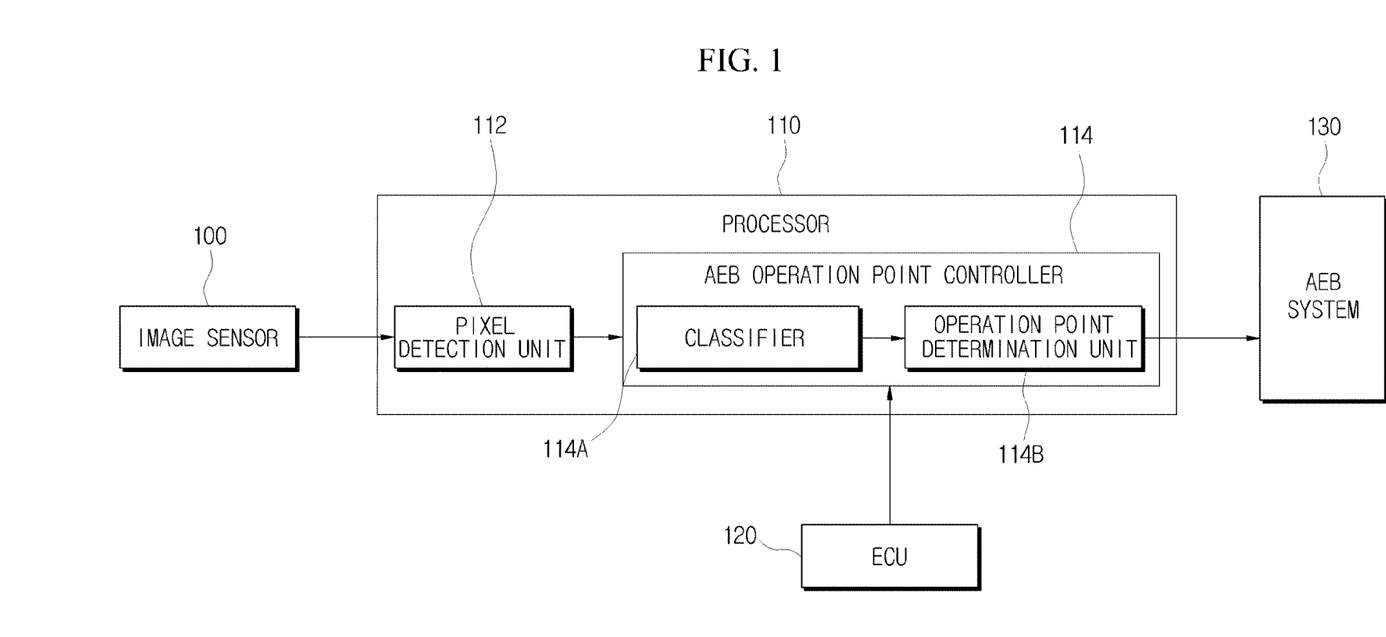
FIG. 1 is a block diagram illustrating a configuration of a preceding vehicle detecting system according to an exemplary embodiment of the present invention.
Figure 2:
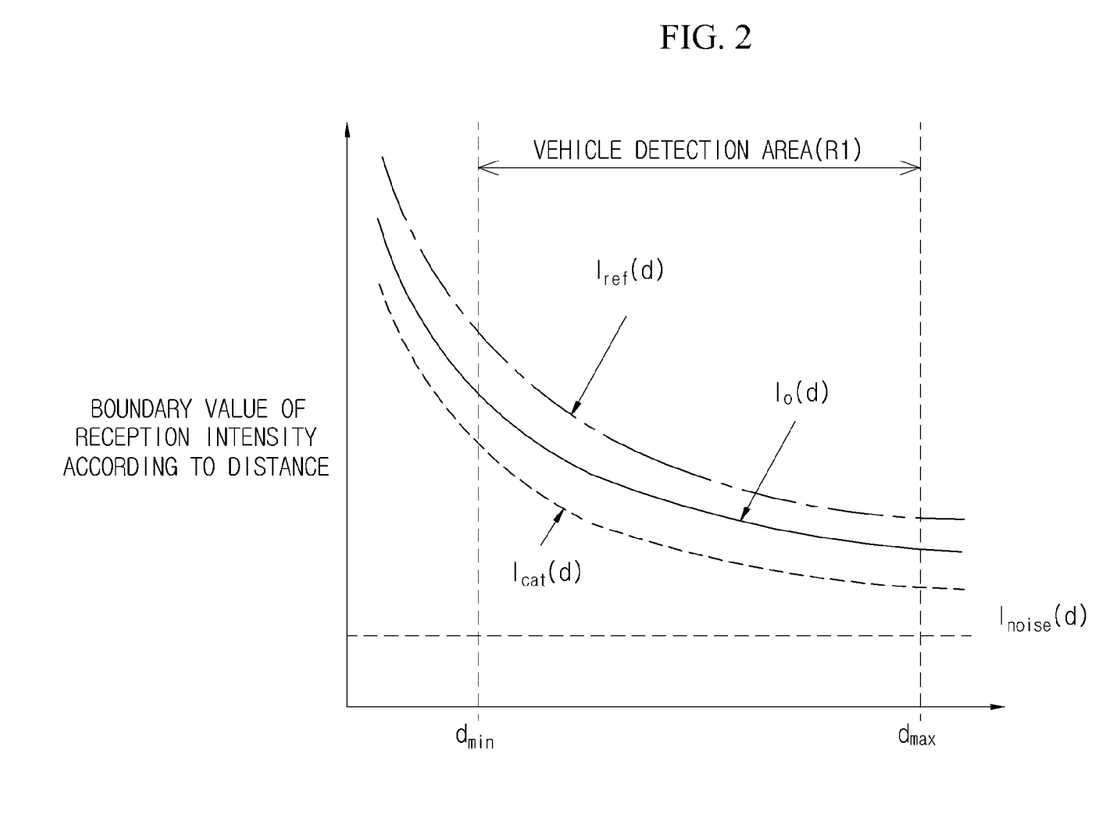
FIG. 2 is a graph illustrating a boundary value $I_o(d)$ of a predetermined reception intensity of light by the preceding vehicle detecting system according to the exemplary embodiment of the present invention.

FIG. 1 is a block diagram illustrating a configuration of a preceding vehicle detecting system according to an exemplary embodiment of the present invention, and FIG. 2 is a graph illustrating a boundary value $I_o(d)$ of a predetermined reception intensity of light by the preceding vehicle detecting system according to the exemplary embodiment of the present invention.

As illustrated in FIG. 1, the preceding vehicle detecting system according to the exemplary embodiment of the present invention detects and classifies light reflected and returned from a preceding vehicle from light reflected and returned from an obstacle at a front side of a vehicle, and adjusts an operation point of an AEB system of a host vehicle. To this end, the preceding vehicle detecting system includes an image sensor 100 and a processor 110.

The image sensor 100 emits light, such as laser pulse, measures a time for the emitted light to be reflected and returned from an obstacle at a front side, and calculates a position of the obstacle. Further, the image sensor 100 generates image information 10 in which the calculated position of the obstacle is expressed by reception intensity (I(x,y,d)) of light according to a distance.

I is a function representing reception intensity of light, and x means an interval between obstacles which reflect light, y means a height of an obstacle measured from the ground, and d means an interval between the obstacle and the host vehicle.

The image sensor 100 may be a LIDAR sensor.

The processor 110 detects light reflected from the preceding vehicle from the image information 10 generated by the image sensor 100, classifies the kind of vehicle of the preceding vehicle from the detected light, and adjusts an operation point of the AEB system of the host vehicle. To this end, the processor 110 includes a pixel detection unit 112 and an AEB operation point controller 114.

Particularly, the pixel detection unit 112 within the processor 110 generates image information expressed as reception intensity I(d) of light according to an interval d between an obstacle and the host vehicle, except for x that is an interval between the obstacles and y that is a height of an obstacle, based on the image information generated by the image sensor 100, and detects light reflected from the rear reflectors of the preceding vehicle based on a value of I(d) belonging to a specific range.

In this case, in order to detect a pixel area having the reception intensity of the light reflected from the rear reflector of the preceding vehicle, the pixel detection unit 112 uses reception intensity $I_{cat}(d)$ of a cat's eye according to a distance to the host vehicle, which is previously learned and predetermined, reception intensity $I_{ref}(d)$ of the rear reflector, and a boundary value $I_o(d)$ for detecting the rear reflector of the preceding vehicle.

Here, the boundary value $I_o(d)$ is a value set through an experiment or updated through continuous learning while the vehicle travels and stored in the pixel detection unit 112, and as illustrated in FIG. 2, has a value between the reception intensity $I_{cat}(d)$ of the cat's eye and the reception intensity $I_{ref}(d)$ of the rear reflector.

In general, the reception intensity of the light reflected from the rear reflector of the preceding vehicle has a value larger than the reception intensity $I_{cat}(d)$ of the cat's eye and the boundary value $I_o(d)$, and equal to or smaller than the reception intensity $I_{ref}(d)$ of the rear reflector. Accordingly, the pixel detection unit 112 detects a value of I(d) having the value of the reception intensity within the aforementioned range as the reception intensity of the light reflected from the rear reflector of the preceding vehicle, and generates image information $P_{ref}(x', y', d')$ for the pixel area having the detected value of I(d).

The AEB system operation point controller 114 within the processor 110 classifies the kind of vehicle of the preceding vehicle by using the information generated by the pixel detection unit 112, compares the classified kind of vehicle of the preceding vehicle with travelling information 12 about the host vehicle, and adjusts an operation point of the AEB system of the host vehicle. To this end, the AEB system operation point controller 114 includes a classifier 114A and an operation point determination unit 114B.

Particularly, the classifier 114A within the AEB system operation point controller 114 converts the image information $P_{ref}(x', y', d')$ generated by the pixel detection unit 112 into image information $P_{ref}(d')$ including interval information d' between the host vehicle and the preceding vehicle, groups adjacent pixel areas $P_{ref}(d')$, and generates the grouped pixel areas $P_{ref}(d')$ as image information expressed as $P_{ref\_GP}(d')$. Here, one pixel area $P_{ref\_GP}(d')$ grouped means light reflected from one rear reflector of the preceding vehicle.

Next, the classifier 114A counts the number of grouped pixel areas $P_{ref\_GP}(d')$, and first classifies the kind of vehicle of the preceding vehicle by using the number of counted $P_{ref\_GP}(d')$, that is, the number of rear reflectors of the preceding vehicle.

In general, the number of rear reflectors mounted in a two-wheel vehicle is one, and the number of rear reflectors mounted in a four-wheel vehicle is two, so that the classifier 114A classifies the kind of vehicle of the preceding vehicle into a two-wheel vehicle or a four-wheel vehicle by using the number of rear reflectors counted.

When the kind of vehicle of the preceding vehicle is first classified, the classifier 114A calculates an interval between the pixel areas $P_{ref\_GP}(d')$, compares the calculated interval between the pixel areas $P_{ref\_GP}(d')$, that is, the interval between the rear reflectors, with a pre-stored reference rear reflector interval, and secondarily classifies the kind of vehicle of the preceding vehicle into a small-size vehicle, a midsize vehicle, and a full-size vehicle.

For example, when the number of rear reflectors is two, and the interval between the rear reflectors has a value between 1.5 to 1.6 m, the classifier 114A may classify the kind of vehicle of the preceding vehicle into a four-wheel midsize vehicle.

In the meantime, when the number of $P_{ref\_GP}(d')$ is three, that is, a four-wheel vehicle and a two-wheel vehicle exist together at the front side, the classifier 114A calculates intervals between the detected rear reflectors and classifies the second largest interval among the intervals between the three rear reflectors into the interval of the four-wheel vehicle.

Briefly, when the number of calculated pixel areas is one, the classifier 114A classifies the kind of vehicle of the preceding vehicle into a two-wheel vehicle. Further, when the number of calculated pixel areas is two, and the interval between the pixel areas belongs to a predetermined reference interval range of rear reflectors of a four-wheel vehicle, the classifier 114A classifies the kind of vehicle of the preceding vehicle into a four-wheel vehicle. Further, when the number of calculated pixel areas is three, the classifier 114A classifies a pixel area having the second largest interval among the intervals of the pixel areas into the pixel area of the four-wheel vehicle.

The operation point determination unit 114B determines an operation point of the AEB system of the vehicle by using information on the kind of vehicle of the preceding vehicle classified by the classifier 114A and the travelling information 12 of the host vehicle received from an electronic control unit (ECU) 120 of the host vehicle, and transmits an AEB system operation signal 14 to the AEB system 130 of the host vehicle.

Here, the travelling information 12 of the host vehicle received from the ECU 120 includes information, such as the kind of vehicle, braking force, a speed, a steering angle, a wiper state, and a headlight state.

Hereinafter, a method of detecting a rear reflector of a preceding vehicle will be described in detail with reference to FIG. 3.

Figure 3:
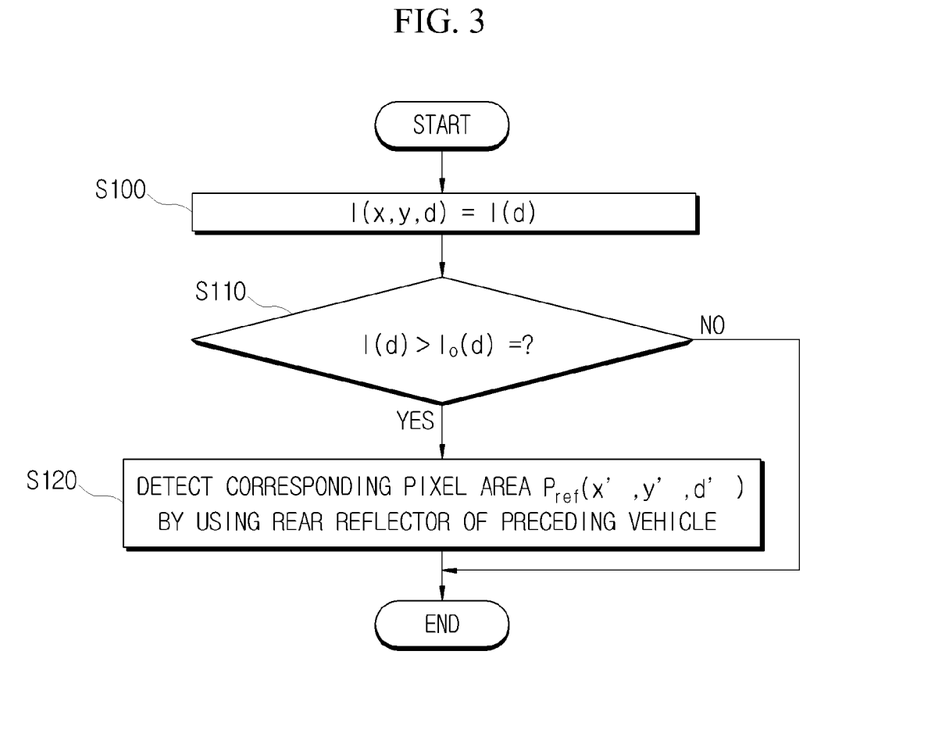
FIG. 3 is a flowchart illustrating a method of detecting a rear reflector of a preceding vehicle by the preceding vehicle detecting system according to the exemplary embodiment of the present invention.

FIG. 3 is a flowchart illustrating a method of detecting a rear reflector of a preceding vehicle by the preceding vehicle detecting system according to the exemplary embodiment of the present invention.

As illustrated in FIG. 3, image information, in which reception intensity I(x, y, d) of light received from the image sensor is expressed as reception intensity I(d) of light according to an interval d between an obstacle and a host vehicle, except for x, which is an interval between obstacles and y, which is a height of an obstacle, is generated (S100).

Next, a value of the reception intensity I(d), which is larger than a predetermined boundary value $I_o(d)$, is detected among the reception intensities I(d) of the light reflected from the obstacle (S110).

Here, $I_o(d)$ is a learned boundary value, and is information obtained through a calculation using learned reception intensity $I_{cat}(d)$ of a cat's eye according to a distance to the host vehicle, learned reception intensity $I_{ref}(d)$ of the rear reflector, and reception intensity $I_{noise}(d)$ of a surrounding obstacle reflecting fine light, and $I_o(d)$ has a value larger than $I_{noise}(d)$ and between $I_{cat}(d)$ and $I_{ref}(d)$.

Next, light reflected from the rear reflector of the preceding vehicle is detected by using the value of I(d) belonging to the aforementioned range, and a corresponding pixel area is generated as image information of $P_{ref}(x', y', d')$.

Next, the kind of vehicle of the preceding vehicle is classified by using the information on the pixel area $P_{ref}(x', y', d')$ of the rear reflector generated by the classifier 114A illustrated in FIG. 1, and information on the classified kind of vehicle is used for calculating an operation point of the AEB system of the host vehicle by the operation point determination unit 114B.

Hereinafter, a method of classifying the kind of vehicle of the preceding vehicle will be described in detail with reference to FIG. 4.

Figure 4:
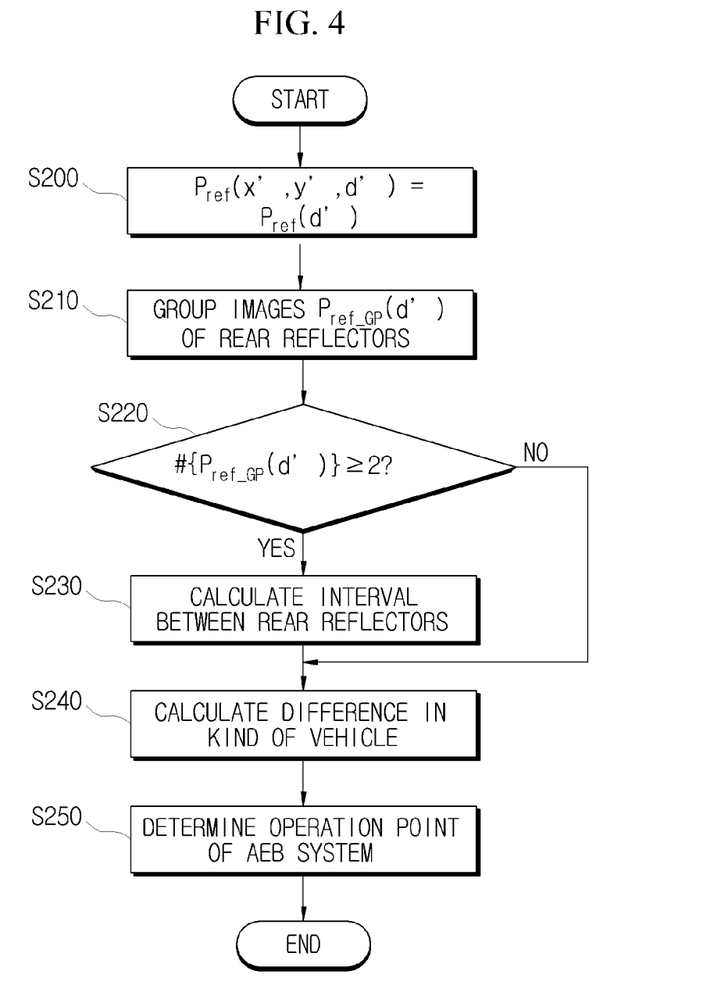
FIG. 4 is a flowchart illustrating a method of classifying the kind of vehicle of a preceding vehicle by the preceding vehicle detecting system according to the exemplary embodiment of the present invention.

FIG. 4 is a flowchart illustrating a method of classifying the kind of vehicle of a preceding vehicle by the preceding vehicle detecting system according to the exemplary embodiment of the present invention.

As illustrated in FIG. 4, image information, in which the pixel area $P_{ref}(x', y', d')$ of the rear reflector of the preceding vehicle detected by the pixel detection unit 112 illustrated in FIG. 1 is expressed as pixel area $P_{ref}(d')$ using only d' that is information on an interval between the host vehicle and the preceding vehicle, is generated (S200).

Next, the adjacent pixel areas $P_{ref}(d')$ are grouped, and the grouped pixel areas $P_{ref}(d')$ are generated as image information expressed as $P_{ref\_GP}(d')$ (S210). Here, one pixel area $P_{ref\_GP}(d')$ grouped means light reflected from one rear reflector of the preceding vehicle.

The number of grouped pixel areas $P_{ref\_GP}(d')$ is calculated, and the kind of vehicle of the preceding vehicle is first classified by using the number of $P_{ref\_Gp}(d')$, that is, the number of rear reflectors of the preceding vehicle.

In general, the number of rear reflectors mounted in a two-wheel vehicle is one, and the number of rear reflectors mounted in a four-wheel vehicle is two, so that the kind of vehicle of the preceding vehicle is classified into a two-wheel vehicle or a four-wheel vehicle by using the number of rear reflectors calculated.

Here, when the number of $P_{ref\_GP}(d')$ is two or more (S220), that is, the kind of vehicle of the preceding vehicle is classified into a four-wheel vehicle, an interval between the detected rear reflectors is calculated (S230), and the calculated interval between the rear reflectors is compared with a pre-stored reference rear reflector interval, and the kind of vehicle of the preceding vehicle is secondarily classified into a small-size vehicle, a midsize vehicle, and a full-size vehicle.

Table 1 is an interval reference table representing intervals between rear reflectors according to the kind of vehicle.

TABLE 1

| Classification | Two-wheel vehicle (2W) | Four-wheel vehicle (4W) | | |
| --- | --- | --- | --- | --- |
| | | Small-size vehicle | Midsize vehicle | Full-size vehicle |
| Interval between rear reflectors (m) | $S_2$ 0 | Small ($S_{4S}$) 1.4 to 1.5 | Middle ($S_{4M}$) 1.5 to 1.6 | Large ($S_{4L}$) Larger than 1.6 |
| Braking distance | Short | Short | Middle | Long |
| Degree of blinding | small | Small | Middle | Large |

Referring to Table 1, when the number of rear reflectors detected is two, and the interval between the rear reflectors has a value between 1.5 to 1.6 m, the kind of vehicle of the preceding vehicle may be classified into a four-wheel midsize vehicle.

When the number of $P_{ref\_GP}(d')$ is three, that is, a four-wheel vehicle and a two-wheel vehicle exist together at the front side, intervals between the detected rear reflectors are classified, and the second largest interval among the intervals between the three rear reflectors is classified into the interval of the four-wheel vehicle.

Briefly, when the number of calculated pixel areas is one, the kind of vehicle of the preceding vehicle is classified into a two-wheel vehicle. Further, when the number of calculated pixel areas is two, and the interval between the pixel areas belongs to a predetermined reference interval range of rear reflectors of a four-wheel vehicle, the kind of vehicle of the preceding vehicle is classified into a four-wheel vehicle. Further, when the number of calculated pixel areas is three, a pixel area having the second largest interval among the intervals of the pixel areas is classified into the pixel area of the four-wheel vehicle.

Then, the operation point determination unit 114B illustrated in FIG. 1 receives the kind of vehicle of the preceding vehicle classified by the classifier 114A and information on the kind of vehicle of the host vehicle received from the ECU of the host vehicle, numerically calculates a difference in the kind of vehicle between the preceding vehicle and the host vehicle (S240), and determines the operation point of the AEB system of the host vehicle based on the calculated value of the difference in the kind of vehicle (S250).

Hereinafter, a method of discriminating a two-wheel vehicle from a four-wheel vehicle when the two-wheel vehicle and the four-wheel vehicle exist together at a front side will be described in detail with reference to FIG. 5.

Figure 5:
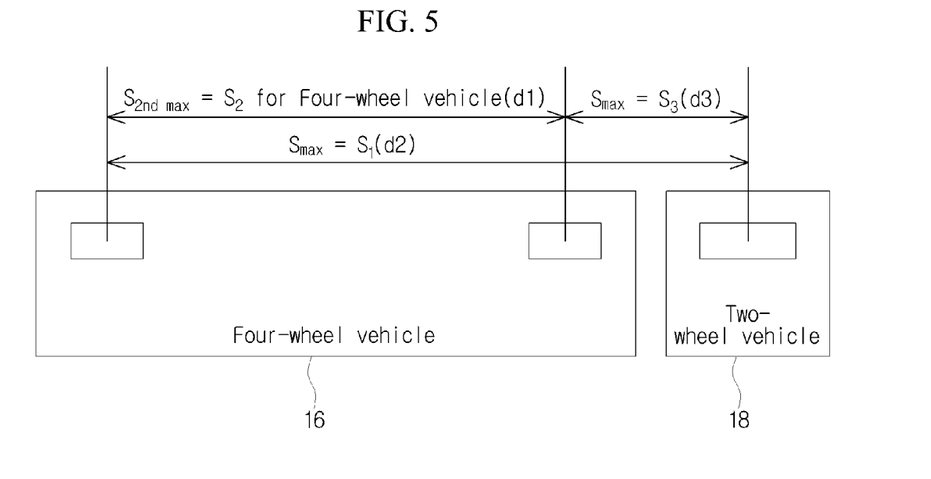
FIG. 5 is a diagram for describing a method of discriminating a two-wheel vehicle from a four-wheel vehicle by the preceding vehicle detecting system according to the exemplary embodiment of the present invention when the two-wheel vehicle and the four-wheel vehicle exist together at a front side.

FIG. 5 is a diagram for describing a method of discriminating a two-wheel vehicle from a four-wheel vehicle by the preceding vehicle detecting system according to the exemplary embodiment of the present invention when the two-wheel vehicle and the four-wheel vehicle exist together at a front side.

As illustrated in FIG. 5, when a four-wheel vehicle 16 and a two-wheel vehicle 18 exist together at a front side, that is, when the number of $P_{ref\_GP}(d')$ calculated by the classifier 114A of FIG. 1 is three, the classifier 114A may calculate intervals S1, S2, and S3 between the detected rear reflectors, and classify the vehicle having the second largest interval S2 ($S_{2^{nd}max}$) among the three intervals between the rear reflectors as the four-wheel vehicle 16.

Hereinafter, a method of determining an operation point of the AEB system according to a difference in the kind of vehicle between the host vehicle and the preceding vehicle according to the exemplary embodiment of the present invention will be described in detail with reference to FIG. 6.

Figure 6:
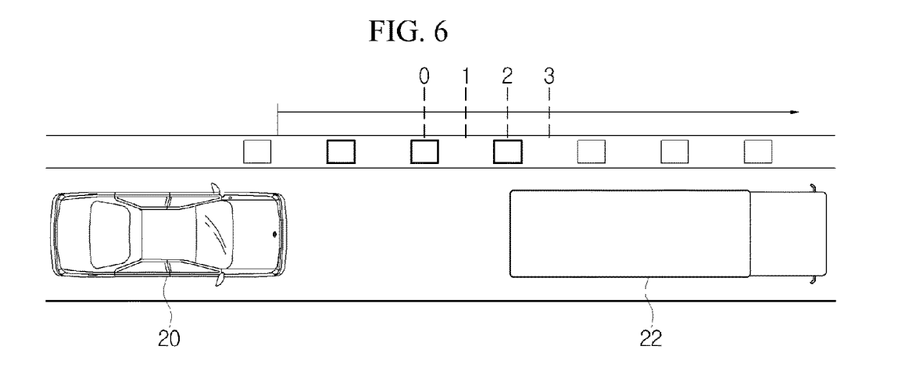
FIG. 6 is a diagram illustrating an example of an operation point of an autonomous emergency braking (AEB) system determined according to a difference in the kind of vehicle between a host vehicle and a preceding vehicle by the preceding vehicle detecting system according to the exemplary embodiment of the present invention.

FIG. 6 is a diagram illustrating an example of an operation point of the AEB system determined according to a difference in the kind of vehicle between the host vehicle and the preceding vehicle by the preceding vehicle detecting system according to the exemplary embodiment of the present invention.

When the kind of vehicle of the host vehicle is classified into a small-size vehicle 20 and the kind of vehicle of the preceding vehicle is classified into a full-size vehicle 22, the classifier 114 may determine an operation point of the AEB system as 2 according to Table 2.

Table 2 represents numerically expressed operation points of the AEB system according to a difference in the kind of vehicle.

TABLE 2

| Classification | Two-wheel vehicle | Small-size vehicle | Midsize vehicle | Large-size vehicle |
|---|---|---|---|---|
| Two-wheel vehicle | 0 | 1 | 2 | 3 |
| Small-size vehicle | 1 | 0 | 1 | 2 |
| Midsize vehicle | 2 | 1 | 0 | 1 |
| Large-size vehicle | 3 | 2 | 1 | 0 |

Here, an operation point of the AEB system is a relative numerical value obtained by comparing sizes or weight between the host vehicle and the preceding vehicle. When a size or weight of the vehicle is large, braking force is decreased and a degree of driving view blinding is increased, so that it is possible to achieve an effect in that a degree of collision impact and damage is decreased when an accident is incurred by flexibly adjusting the operation point of the AEB system.

Hereinafter, an exemplary embodiment of the present invention will be schematically described with reference to FIGS. 7, 8, and 9.

Figure 7:
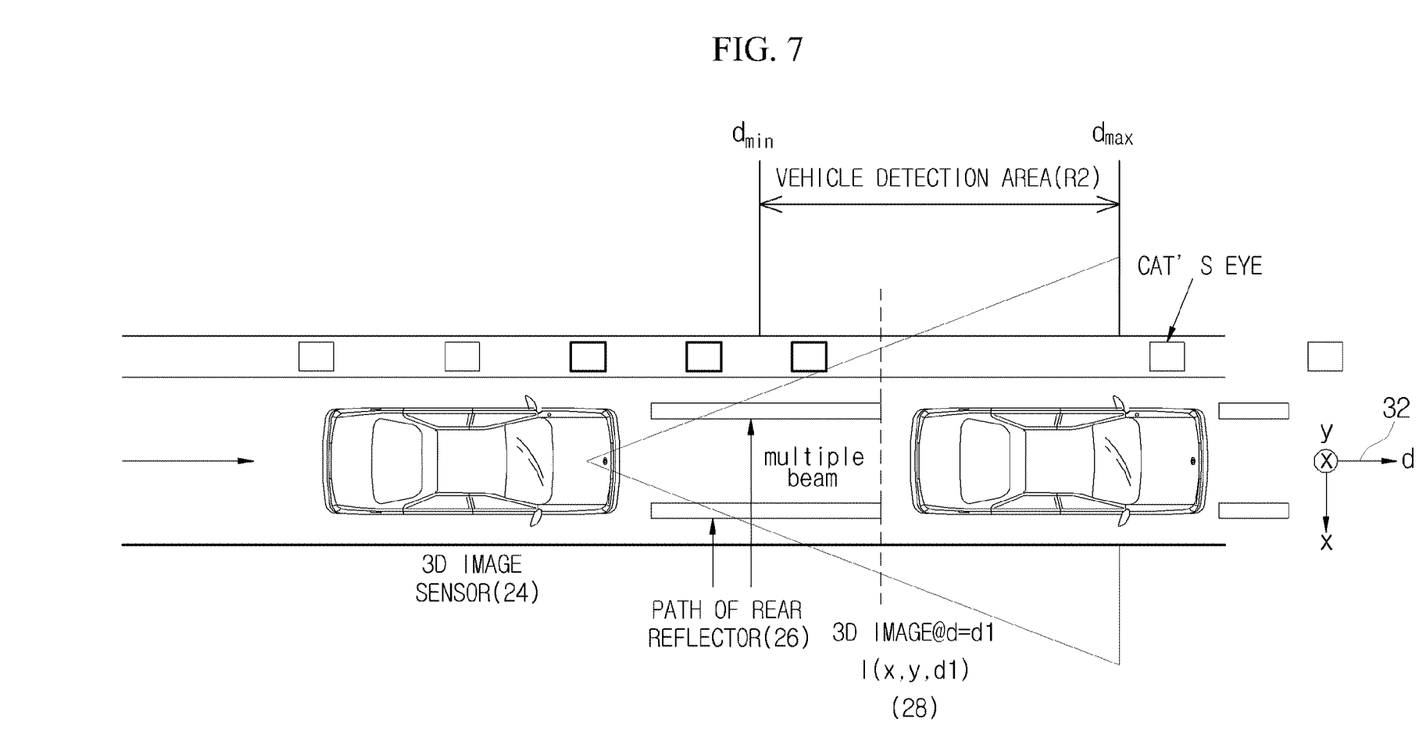
FIG. 7 is a diagram schematically illustrating a method of detecting a preceding vehicle by the preceding vehicle detecting system according to the exemplary embodiment of the present invention.
Figure 8:
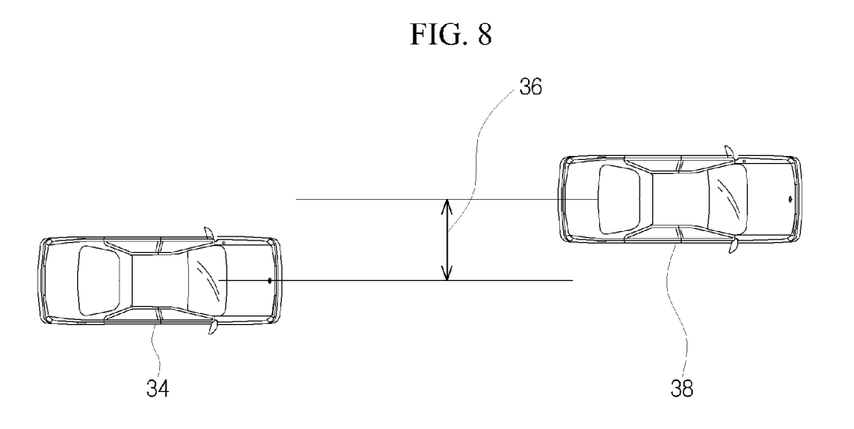
FIG. 8 is a diagram for describing an offset difference that is one of the conditions for detecting a preceding vehicle of FIG. 7.
Figure 9:
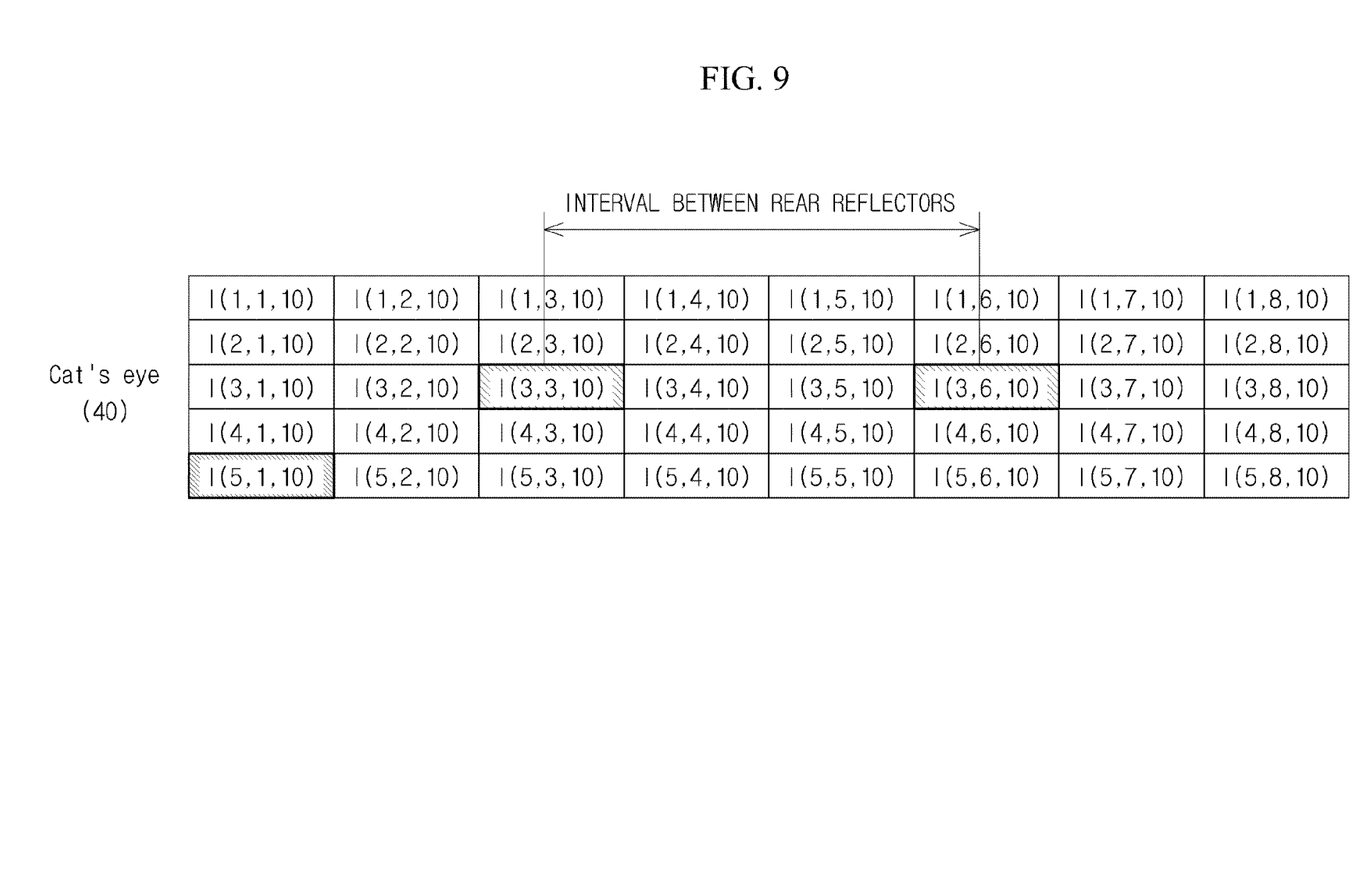
FIG. 9 is a diagram illustrating an example of a 3D image with 5×8 pixels photographed by the preceding vehicle detecting system according to the exemplary embodiment of the present invention.

FIG. 7 is a diagram schematically describing a method of detecting a preceding vehicle by the preceding vehicle detecting system according to the exemplary embodiment of the present invention, FIG. 8 is a diagram for describing an offset difference that is one of the conditions for detecting a preceding vehicle of FIG. 7, and FIG. 9 is a diagram illustrating an example of a 3D image with 5×8 pixels photographed by the preceding vehicle detecting system according to the exemplary embodiment of the present invention.

In order to detect a vehicle according to the method of detecting a preceding vehicle based on a 3D image according to an exemplary embodiment of the present invention, five conditions below may be assumed.

A host vehicle and a preceding vehicle travel within the same lane.

Each of the two rear reflectors is expressed by one pixel or more.

An interval (S2 or S3 of FIG. 8) between the rear reflectors is expressed by two pixels or more.

Only when all of the two rear reflectors are detected, the vehicle may be classified.

An offset between the host vehicle and the preceding vehicle is 50% or lower.

For example, as illustrated in FIG. 7, when a 3D image sensor 24 mounted in the host vehicle detects light reflected from an obstacle within a vehicle detection area R2, the 3D image sensor 24 may obtain the two rear reflectors mounted in the preceding vehicle and a cat's eye 30 as 3D image information.

When an offset 36 between the host vehicle and the preceding vehicle is 50% or lower as illustrated in FIG. 8, each of the rear reflectors of the preceding vehicle is expressed with reception intensity 28 of light of one pixel or more, and an interval between the rear reflectors is expressed with two pixels or more as illustrated in FIG. 9, the three conditions among the aforementioned conditions are satisfied, so that a condition for detecting a preceding vehicle is established.

Here, the offset 36 is one condition for detecting a vehicle, and is a reference value representing a degree of crossing between the preceding vehicle, which travels travelling within the same lane as that of the host vehicle, and the host vehicle, and the offset 36 may be determined according to a view angle, resolution, and a detection distance of the LIDAR sensor.

A region, in which the vehicle is detectable based on the rear reflector, may be indicated by R2 as illustrated in FIGS. 7, and R2 may be defined as a minimum $d_{min}$ to a maximum $d_{max}$.

For example, when the obtained 3D image information may be illustrated as FIG. 9, a distance dl between a preceding vehicle 38 and a host vehicle 34 is 20 m, and an interval between the rear reflectors discriminated from the cat's eye 30 is calculated as 1.56 m, the 3D image sensor 24 may classify the preceding vehicle into a midsize vehicle according to the aforementioned interval reference table of the rear reflector according to the kind of vehicle of Table 1.

The 3D image sensor 24 calculates a difference in the kind of vehicle between the host vehicle and the preceding vehicle based on vehicle information, such as braking force and a speed, about the host vehicle, and transmits an AEB system operation signal, which is set according to the calculated difference in the kind of vehicle, to the ECU.

The technique for controlling braking of a host vehicle according to the kind of vehicle of a preceding vehicle and a distance between the preceding vehicle and the host vehicle by the AEB system of the vehicle is publicly known, so that a detailed description thereof will be omitted.

The above description is simply given for illustratively explaining the technical spirit of the present invention, and those skilled in the art will appreciate that various modifications and changes are possible, without departing from the fundamental characteristic of the invention.

Accordingly, the exemplary embodiments disclosed in the present invention are not intended to limit but explain the technical spirit of the present invention, and the scope of the present invention is not limited by the exemplary embodiments. The protection scope of the present invention should be construed based on the following appended claims and it should be appreciated that the technical spirit included within the scope identical or equivalent to the claims belongs to the protection scope of the present invention.

What is claimed is:

1. An apparatus to detect a preceding vehicle, comprising:
   an image sensor configured to generate image information containing information on reception intensity of light reflected from a preceding vehicle;

a pixel detection unit configured to detect pixel areas corresponding to light reflected from rear reflectors of the preceding vehicle from the generated image information; and an autonomous emergency braking (AEB) operation point controller configured to group adjacent pixel areas among the detected pixel areas, and to classify a kind of vehicle of the preceding vehicle by using at least one element of information between information on a number of the grouped pixel areas and information on an interval.

2. The apparatus of claim 1, wherein the AEB operation point controller comprises:

a classifier configured to classify the kind of vehicle of the preceding vehicle, and an operation point determination unit configured to determine an operation point of an AEB system of a host vehicle according to the classified kind of vehicle.

3. The apparatus of claim 1, wherein the AEB operation point controller is further configured to classify the preceding vehicle as a two-wheel vehicle, in response to the number of the grouped pixel areas being one, and to classify the preceding vehicle as a four-wheel vehicle, in response to the number of the grouped pixel areas being two and an interval between the grouped pixel areas falling within a rear reflector reference interval range.

4. The apparatus of claim 1, wherein the AEB operation point controller is further configured to classify a group comprising a second largest interval among the intervals between the grouped pixel areas as a group of the rear reflectors of the four-wheel vehicle, in response to the number of the grouped pixel areas being three.

5. The apparatus of claim 1, wherein the AEB operation point controller is further configured to classify the preceding vehicle as any one of a small-size vehicle, a midsize vehicle, and a full-size vehicle, according to the information on the interval between the grouped pixel areas.

6. The apparatus of claim 1, wherein the AEB operation point controller is further configured to calculate a difference in a grade value between the preceding vehicle and the host vehicle with reference to a table in which grades of the kind of vehicle are numerically expressed, and to determine an operation point of the AEB system of the host vehicle according to a result of the calculation.

7. The apparatus of claim 1, wherein the pixel detection unit is further configured to detect light reflected from the rear reflector of the preceding vehicle by using a value of reflection intensity of light from a pre-learned cat's eye and a value of reflection intensity from the rear reflector.

8. The apparatus of claim 1, wherein the image sensor comprises a light detection and ranging (LIDAR) sensor which is configured to generate reception intensity of light reflected from the preceding vehicle as 3-dimensional (3D) image information.

9. A method of detecting a preceding vehicle, comprising:
generating image information containing information on reception intensity of light reflected from a preceding vehicle;
detecting pixel areas corresponding to light reflected from rear reflectors of the preceding vehicle from the generated image information;
grouping adjacent pixel areas among the detected pixel areas;
classifying a kind of vehicle of the preceding vehicle by using at least one element of information between the information on a number of the grouped pixel areas and information on an interval; and
determining an operation point of an autonomous emergency braking (AEB) system of a host vehicle according to the classified kind of vehicle.

10. The method of claim 9, wherein the classifying of the kind of vehicle of the preceding vehicle comprises classifying the preceding vehicle as a two-wheel vehicle, in response to the number of grouped pixel areas being one.

11. The method of claim 9, wherein the classifying of the kind of vehicle of the preceding vehicle comprises classifying the preceding vehicle as a four-wheel vehicle, in response to the number of grouped pixel areas being two and an interval between the grouped pixel areas falling within rear reflector reference interval range.

12. The method of claim 9, wherein the classifying of the kind of vehicle of the preceding vehicle comprises classifying a group comprising a second largest interval among the intervals between the grouped pixel areas as the group of rear reflectors of the four-wheel vehicle, in response to the number of grouped pixel areas being three.

13. The method of claim 9, wherein the classifying of the kind of vehicle of the preceding vehicle comprises classifying the preceding vehicle as any one of a small-size vehicle, a midsize vehicle, and a full-size vehicle according to the information on the interval between the grouped pixel areas.

14. The method of claim 9, wherein the determining of the operation point of the AEB system of the host vehicle comprises calculating a difference in a grade value between the preceding vehicle and the host vehicle with reference to a table, in which grades of the kind of vehicle are numerically expressed, and determining an operation point of the AEB system of the host vehicle according to a result of the calculation.

15. The method of claim 9, wherein the detecting of the pixel areas corresponding to the light reflected from the rear reflectors of the preceding vehicle comprises detecting light reflected from the rear reflector of the preceding vehicle by using a value of reflection intensity of light from a pre-learned cat's eye and a value of reflection intensity from the rear reflector.

16. A method of detecting a preceding vehicle, comprising:
generating image information containing information on reception intensity of light reflected from a preceding vehicle;
detecting pixel areas corresponding to light reflected from rear reflectors of the preceding vehicle from the generated image information;
grouping adjacent pixel areas among the detected pixel areas;
classifying a kind of vehicle of the preceding vehicle by using at least one element of information between the information on the number of grouped pixel areas and information on an interval; and
determining an operation point of an autonomous emergency braking (AEB) system of a host vehicle according to the classified kind of vehicle,
wherein the classifying of the kind of vehicle of the preceding vehicle comprises classifying the preceding vehicle into a two-wheel vehicle, in response to the number of grouped pixel areas being one.

* * * * *